United States Patent [19]
Feig et al.

[11] Patent Number: 5,293,434
[45] Date of Patent: Mar. 8, 1994

[54] TECHNIQUE FOR USE IN A TRANSFORM CODER FOR IMPARTING ROBUSTNESS TO COMPRESSED IMAGE DATA THROUGH USE OF GLOBAL BLOCK TRANSFORMATIONS

[75] Inventors: Ephraim Feig, Briarcliff Manor; William B. Pennebaker, Jr., Carmel; Keith S. Pennington, Somers, all of N.Y.

[73] Assignee: International Business Machines Corporation, Armonk, N.Y.

[21] Appl. No.: 683,399

[22] Filed: Apr. 10, 1991

[51] Int. Cl.$^5$ .......................... G06K 9/36; G06F 15/00
[52] U.S. Cl. .......................................... 382/56; 382/43; 364/725; 364/726; 358/432
[58] Field of Search ............... 382/56, 43, 9; 358/427, 358/432, 433; 364/725-727, 826-827

[56] References Cited

U.S. PATENT DOCUMENTS

| | | | |
|---|---|---|---|
| 4,196,448 | 4/1980 | Whitehouse et al. | 358/135 |
| 4,394,774 | 7/1983 | Widergren et al. | 382/56 |
| 4,504,860 | 3/1985 | Nicol et al. | 358/133 |
| 4,580,162 | 4/1986 | Mori | 358/135 |
| 4,675,750 | 6/1987 | Collins et al. | 360/9.1 |
| 4,698,689 | 10/1987 | Tzou | 358/260 |
| 4,717,962 | 1/1988 | Moore | 358/260 |
| 4,776,030 | 10/1988 | Tzou | 382/56 |
| 4,807,029 | 2/1989 | Tanaka | 358/133 |
| 4,807,042 | 2/1989 | Tanaka | 358/260 |
| 4,807,053 | 2/1989 | Heijnemans | 358/335 |
| 5,007,001 | 4/1991 | Lloyd-Williams | 382/56 |

OTHER PUBLICATIONS

K. R. Rao et al, Discrete Cosine Transform—Algorithms, Advantages, Applications (© 1990; Academic Press, San Diego), pp. 88-121.
R. L. Pickholtz et al, "Theory of Spread-Spectrum Communications—A Tutorial", IEEE Transactions on Communications, vol. COM-30, No. 5, May 1982, pp. 855-884.
W. Chen et al, "Adaptive Coding of Monochrome and Color Images", IEEE Transactions on Communications, vol. COM-25, No. 11, Nov. 1977, pp. 1285-1292.
N. Ahmed et al, "Discrete Cosine Transform", IEEE Transactions on Computers, Jan. 1974, pp. 90-93.
W. W. Peterson, Error-Correcting Codes, Second Edition, (© 1972: MIT Press; Cambridge, Mass.), pp. 129-131.

*Primary Examiner*—Leo H. Boudreau
*Assistant Examiner*—Chris Kelley
*Attorney, Agent, or Firm*—Peter L. Michaelson

[57] ABSTRACT

A technique for use in, illustratively, a transform coder for imparting robustness against burst (or similar) errors to data patterns, such as illustratively two-dimensional image data, that exhibit local redundancy. Robustness is provided, in the case of images, by passing localized (blocked) image data, i.e. either pixel values or transformed, illustratively discrete cosine transform (DCT), image coefficient values therefor, through a global block transform, such as a global block Hadamard transform, prior to compression coding in order to produce "holographic-like" compressed data for subsequent transmission and/or storage. Specifically, globally transforming an image in this fashion effectively spreads (diffuses) the image data in each block of pixels in that image or in the transform coefficients therefor in a regularly ordered pre-defined global manner throughout the entire image to create what is, in effect, intentionally "smeared" image data. By subjecting the "smeared" image data upon de-compression to an inverse global block transformation, such as an inverse global block Hadamard transformation, then, even if a portion of the "smeared" data for an image is obliterated during transmission or playback, the entire image can still be advantageously reconstituted, though at a somewhat degraded quality, from the remaining "smeared" data.

12 Claims, 5 Drawing Sheets

IMAGE DIVISION PRIOR TO GLOBAL BLOCK HADAMARD TRANSFORMATION

IMAGE DIFFUSION BY GLOBAL BLOCK HADAMARD TRANSFORMATION

EFFECT OF GLOBAL BLOCK HADAMARD TRANSFORMATION

TECHNIQUE FOR USE IN A TRANSFORM CODER FOR IMPARTING ROBUSTNESS TO COMPRESSED IMAGE DATA THROUGH USE OF GLOBAL BLOCK TRANSFORMATIONS

BACKGROUND OF THE INVENTION

1. Field of the Invention

The invention relates to a technique for use in illustratively a transform coder for imparting robustness against burst (or similar) errors to data, such as image data, that exhibits local redundancy.

2. Description of the Prior Art

Image data, including still and motion images, is being increasingly manipulated in electronic form due, in part, to continued advances that are being made in the processing speed and sophistication available through digital circuitry. Generally, this manipulation involves, at least in part, for each separate image, either transmission or storage of a large matrix of digitized pixel values that collectively form that image.

Such a matrix (hereinafter referred to as an "image matrix") typically contains a substantial number of bits. For example, a digitized 256 level grayscale image containing 576 rows by 720 columns of eight-bit pixels, produces an image matrix that contains approximately 3.3 Mbits. Increasingly fine horizontal and vertical resolutions produce image matrices that contain larger numbers of bits. Color images, particularly those that are encoded to contain separate color coordinate matrices, contain substantially larger amounts of bits. Inasmuch as transmission bandwidth in a communications system is limited and digital storage capacity is finite, though often quite large, substantial efforts have been expended for some time in the art to devise various techniques that can be used to compress the information contained in an image matrix in order to appreciably reduce the number of bits that need to be transmitted or stored for each individual image.

A family of such compression techniques which is very well-known in the art, and that is showing increasing promise for use with digitized images, involves the use of the discrete cosine transform (DCT). This transform is attractive inasmuch as it, inter alia, only deals with real, and not imaginary, components and computationally is relatively easy and fast to implement. Moreover, the DCT has the advantageous property that most of the information for each image is encoded into relatively few transform coefficients that represent low spatial frequency information which, in general, approximately matches the response pattern of a human eye. Through use of the DCT, very good quality images, for a particular sampling scheme, can result from as little as 1 bit/pixel, while the same scheme with loss-less techniques typically require 4–5 bits/pixel.

In essence, compressing an image using the DCT often involves first horizontally and vertically partitioning a digitized image into separate blocks, each containing typically an 8-by-8 matrix of pixel values. The pixel values in each 8-by-8 block are then separately converted through the DCT into a corresponding 8-by-8 matrix of transform coefficients. Thereafter, each coefficient matrix is quantized to produce quantized DCT coefficients. The quantized coefficients are then converted through a suitable compression coder into an appropriate transmission symbol(s). The quantization process may involve scaling, rounding and/or truncation. If proper quantizing is used, any diminished high spatial frequency content in the image is rarely, if ever, apparent to a viewer. The compression coder is frequently an entropy coder which utilizes increasingly fewer bits to code coefficients for increasingly high spatial frequencies over those used to code the low frequency components. While the quantization process imparts some loss into the image and is irreversible, the coding process used within the compression coder itself is usually reversible and, for the most part, loss-less.

Specifically, for purposes of compression, the coding process (hereinafter referred to as "compression coding") typically involves first sequentially re-ordering the transform coefficients for each block into a so-called zig-zag sampling pattern starting with the DC coefficient (zero frequency component) in the upper left hand corner of the 8-by-8 coefficient matrix. Coefficients for increasing horizontal frequencies are situated horizontally to the right in the matrix; coefficients for increasing vertical frequencies are situated vertically down the matrix. This pattern eventually results in a one-dimensional array of DCT coefficients qualitatively arranged in order of ascending spatial frequencies. The AC coefficients are then encoded in their order of occurrence. A coding technique, such as a Huffman code, is used to efficiently encode, typically through run-length encoding, each run of zero coefficients in a block. This coding scheme also establishes amplitude categories for each non-zero coefficient and assigns a unique codeword to each such category. Each such non-zero DCT coefficient is encoded by a codeword, which specifies the appropriate amplitude category for that coefficient, and is followed by additional bits that identify a precise magnitude of the coefficient within that particular category. A separate codeword is assigned to an end-of-block code and is typically sent after the last non-zero coefficient in the block (unless that coefficient is at position 63). The DC coefficient is often encoded using one-dimensional Differential Pulse Code Modulation (DPCM) using the DC coefficient for the most recently occurring DCT transformed block as a prediction for the DC coefficient of the current transformed block. A Huffman code is frequently used to encode a difference value for the DC coefficient in terms of a unique codeword, that represents an amplitude category for that coefficient relative to a quasi-logarithmic scale, followed by additional bits that specify the coefficient value within that category. A transmission symbol is then formed of each codeword and any associated additional bits, if they exist. Inasmuch as the high order frequency coefficients are frequently zero-valued, increasingly fewer bits are used to encode each coefficient value for increasingly higher spatial frequencies. For additional details regarding the DCT, its use with image data and compression coding of transform coefficients, the reader is referred to K. R. Rao et al, *Discrete Cosine Transform—Algorithms, Advantages, Applications* (©1990: Academic Press, San Diego) and N. Ahmed et al, "Discrete Cosine Transform", *IEEE Transactions on Computers*, January 1974, pages 90–93.

The resulting compression coded bits are then either transmitted through a communication channel to a far end receiver or stored on a suitable media, such as magnetic or optical, for subsequent playback. To construct a received or reconstruct a stored image, the process described above is essentially reversed, including inversion of the DCT, with compressed transformed data as input thereto and pixel data as resulting output therefrom.

Unfortunately, in "real world" environments, burst errors occur which corrupt the transmission or playback of image data. These errors are particularly problematic during data communication over a packet network. In such a network, compressed image data for a single image is sent as a number of successively occurring data packets. As these networks continue to proliferate to provide increasingly economic point-to-point data transport vehicles, more and more images are being transmitted as packet data. A burst (or similar) error, when it occurs and often due to a temporary failure in a communication channel itself or in transmission equipment connected thereto, will simply corrupt and destroy one or more successive packets of image data. As such, a localized portion of the reconstructed image will simply be lost. Hence, a reconstructed image will be depicted as containing a "hole" or blackened area corresponding to the corrupted data. The size of such a hole is directly related to the number of packets that has been lost. The greater the loss, the larger the hole and, conversely, the lesser the loss, the smaller the hole. While a complete loss of localized image data may be tolerated in reconstructed images used in some image processing applications, such a loss is simply intolerable in many other such applications. As such, these latter applications could not be effectively used with image data that underwent compression and experienced burst (or similar) errors. Burst errors can also occur during playback due to, for example, localized defects in the media that will permanently corrupt a portion of the stored image data or by virtue of a condition, such as dirt or the like on the media or an optical sensor, that temporarily obscures the sensed data.

Furthermore, it is expected that the art, in its continual efforts to conserve transmission bandwidth and maximize storage efficiencies, will continue to develop compression schemes to provide increasing amounts of compression for image data, including transform coefficient values. Naturally, as the degree of data compression used in coding image data increases, each packet or stored bit sequence will contain data for a spatially larger portion of the image. Unfortunately, as the compression increases, then a burst (or similar) error, even if it affects only a relatively small or even constant number of packets or stored bits, will consequently obliterate an increasingly larger portion of the image.

Thus a need exists in the art for a technique for use in transmission and/or storage of compressed data, particularly image (including both still and motion) data, and which is capable of imparting robustness to that data against burst or similar errors. Furthermore, such a technique should be suitable for use with transform coders, and particularly but not exclusively with those coders that utilize the DCT.

SUMMARY OF THE INVENTION

We have advantageously overcome the deficiencies known in the art that are associated with lost image data resulting from burst (or similar) errors which typically occur during communication and/or playback of compressed, and particularly DCT transformed, image data.

Specifically, we have discovered that by diffusing localized image data, either pixel data or corresponding block transform coefficient values therefor, in a regular ordered manner globally throughout the data for the entire image, using, for example, a global Hadamard transformation, to create what is in effect intentionally "smeared" image data, then, in the event that a burst (or similar) error subsequently occurs which obliterates a portion of the "smeared" data, the entire image can still be reconstructed, though at a degraded overall quality, from the remaining "smeared" data. Hence, the compressed image data that results from use of our inventive technique will exhibit "holographic-like" properties.

Advantageously, the image data that is lost owing to a burst (or similar) error will not be restricted to any specific spatial locations within the image or any specific bands of spatial frequencies that form the image but will instead be formed of linear combinations of data that occur over the entire image, in terms of both the space and frequency domains. As each burst (or similar) error destroys increasingly larger portions of the "smeared" image data, then the entire image can still be reconstructed, upon de-compression, without substantially any "holes" or the like, though with a higher probability that its overall quality level will decrease. As a result of reconstructing the entire image—even at a degraded quality, our technique will readily and advantageously permit compressed image data to be used in those image processing applications which were prone to the occurrence of burst (or similar) errors and hence could not utilize compressed image data.

In particular, in accordance with our inventive technique, we achieve "holographic-like" image data either by subjecting vertically and horizontally successive blocks of pixel data to a global block Hadamard transformation prior to both transforming that data into the spatial frequency domain, using illustratively the DCT, and compressively coding the resulting transform coefficients, or alternatively by subjecting vertically and horizontally adjacent blocks of, illustratively DCT, transform coefficient values for these pixel blocks to a global block Hadamard transformation prior to compressively coding these coefficients. While these two approaches yield different numerical results due, for the most part, to differences occurring during quantization of the corresponding transform coefficients produced in each approach, the results produced by each of these approaches have substantially the same statistical properties; namely, each portion of the image is formed of pre-defined linear combinations of all the other portions of the image. By inversely transforming the "smeared" image data upon de-compression through an inverse Hadamard transformation, then, even if a portion of the "smeared" data for an image is obliterated during transmission or playback, the entire image can still be reconstituted, though at a somewhat degraded quality, from the remaining permuted ("smeared") image data.

Inasmuch as our inventive technique can be implemented using primarily additions, subtractions and shift operations, our invention possesses the feature of being computationally quite simple, easy and very inexpensive to implement.

Moreover, since our inventive technique functions very well with either transform coefficient values or pixel values, our invention also possesses the feature of being highly compatible with many emergent image processing technologies which will utilize data compression and particularly, but not exclusively, those that are expected to increasingly incorporate discrete cosine transform based compression of one form or another. Furthermore, since these technologies are likely to find increasing use in network communication for so-called mixed media environments (which simultaneously utilize, for example, audio, still and/or motion video), our inventive technique should be particularly attractive for use in conjunction with such communication as well.

BRIEF DESCRIPTION OF THE DRAWINGS

The teachings of the present invention may be readily understood by considering the following detailed description in conjunction with the accompanying drawings, in which.

To facilitate reader understanding, identical reference numerals have been used, where possible, to denote identical elements that are common to the figures.

DETAILED DESCRIPTION

After reading the following description, those skilled in the art will clearly realize that our inventive technique can be used to impart robustness in the presence of burst (or similar) errors to nearly any type of data pattern that contains a sufficient amount of localized redundancy. The robustness afforded by our invention will permit an entire data pattern to be reconstructed, though at reduced overall quality, even if a portion of that pattern, once encoded by our technique, is lost. The data pattern need not be one-dimensional, but can in fact be multi-dimensional, i.e. extending over such as two, three or even more dimensions. Furthermore, the data pattern is not restricted to being spatially oriented data, such as for example image data, but can in fact be temporal or frequency domain based or even existing in other domains. Nevertheless, for the purposes of illustration and to simplify the following discussion, we will discuss our invention in the context of use in a transmission system for transmitting two-dimensional grayscale image data as packet data, and specifically with respect to digitized images that contain matrices of two-dimensional eight-bit pixel data.

Figure 1:
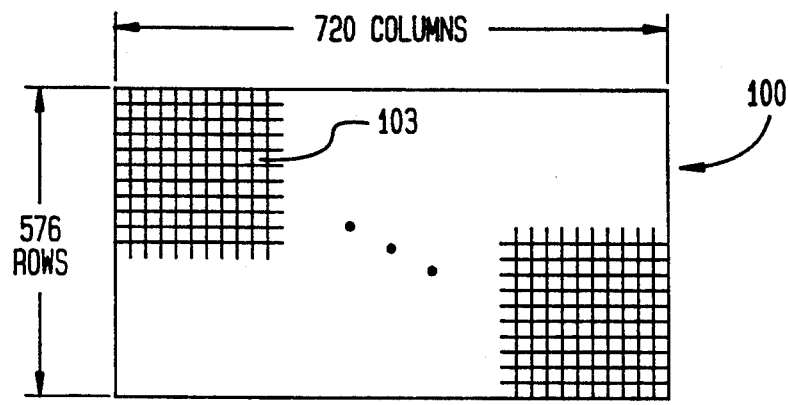
FIG. 1 depicts a typical digitized image.

FIG. 1 depicts a typical digitized grayscale image. As shown, this image is formed of a matrix of pixels (hereinafter referred to as an "image matrix") that has illustratively 576 rows and 720 columns, with each pixel, such as pixel 103, being a multi-bit, typically eight-bit, value. Such a value allows each pixel to be encoded to any one of 256 different intensity levels. At this resolution, image 100 contains on the order of approximately 3.3 Mbits.

In order to efficiently transmit image 100 to a far end location, this image would typically be compressed by first transforming the image through an appropriate transform, such as a two-dimensional discrete cosine transform (DCT), followed by encoding the resulting transform coefficients using, for example, an entropy coder. Strings of zero valued transform coefficients would be encoded using a Huffman code. Differential pulse code modulation would be used to appropriately encode a resulting DC transform coefficient. The encoded values, including appropriate end-of-field codes and other delimiters, would then be converted into appropriate transmission symbols. Thereafter, these symbols would then be transmitted as a sequence of successively occurring packets over a desired packet network to a far end receiver (not shown but which is very well known in the art), which, in conjunction with other circuitry (also not shown but well known) would construct a replica of image 100.

Unfortunately, in "real world" environments, burst (and similar) errors often occur. When a burst (or similar) error occurs during packet communication, this error will simply corrupt and destroy one or more successive packets of image data prior to its reception at the far end receiver. As such, if image 100 is being transmitted, then a localized portion of a replica of this image that has been constructed at the far end will simply be lost. Hence, the constructed replica will be depicted as containing a "hole" or blackened area corresponding to the corrupted data. The size of such a hole is directly related to the number of packets that has been lost. The greater the loss, the larger the hole and, conversely, the lesser the loss, the smaller the hole. While a complete loss of localized image data may be tolerated if the replica were to be used in some image processing applications, such a loss is simply intolerable in many other such applications. As such, these latter applications could not be effectively used with data for image 100 that underwent compression and experienced burst (or similar) errors.

We have advantageously overcome the deficiencies known in the art that are associated with lost image data resulting from burst (or similar) errors which occur, illustratively during packet communication of compressed, and particularly DCT transformed, image data.

Specifically, we have discovered that by diffusing localized data for image 100, either pixel data therefor or corresponding block transform coefficient values therefor, in a regular ordered global manner throughout the data for the entire image but prior to compression coding thereof, using, for example, a global Hadamard transformation, intentionally "smeared" image data will result. In the event that a burst (or similar) error occurs which obliterates a portion of the "smeared" data, then advantageously an entire replica of image 100 can still be constructed at a far end receiver from the remaining "smeared" data for this image, though at an overall level of quality that is degraded from that of image 100. Inasmuch as our technique permits an entire replica of image 100 to be constructed at the far end receiver from only a portion of the data for this image, the compressed image data that results from use of our inventive technique will exhibit "holographic-like" properties.

Advantageously, the image data that is lost owing to a burst (or similar) error will not be restricted to any specific spatial locations within the image or any specific bands of spatial frequencies that form the image but will instead be formed of linear combinations of data that occur over the entire image, in terms of both the space and frequency domains. As each burst (or similar) error destroys increasingly larger portions of the "smeared" image data, then an entire replica of image 100 can still be constructed, upon de-compression, without substantially any "holes" or the like, though with a higher probability that its overall quality level will increasingly degrade. As a result of constructing a replica of an entire image—even at a degraded quality, our technique will readily and advantageously permit compressed image data to be used in those image processing applications that heretofore were prone to the occurrence of burst (or similar) errors and hence could not utilize compressed image data.

In particular, in accordance with our inventive technique, we achieve "holographic-like" image data either by subjecting vertically and horizontally successive blocks of pixel data to a global block Hadamard transformation (i.e. throughout the entire image) prior to both transforming that data into the spatial frequency domain, using illustratively the DCT, and compressively coding the resulting transform coefficients, or alternatively by subjecting vertically and horizontally adjacent blocks of, illustratively DCT, transform coefficient values for these pixel blocks to a global block Hadamard transformation (i.e. throughout all the transform coefficients for the image) prior to compressively coding these coefficients. While these two approaches yield different numerical results due, for the most part, to differences occurring during quantization of the corresponding transform coefficients produced in each approach, the results produced by each of these approaches have substantially the same statistical properties; namely, each portion of the image is formed of pre-defined linear combinations of all the other portions of the image. By inversely transforming the "smeared" image data upon de-compression, then, even if a portion of the "smeared" data for an image is obliterated during transmission or playback, the entire image can still be reconstituted, though at a somewhat degraded quality, from the remaining permuted ("smeared") image data.

Our inventive technique will now be specifically discussed in the context of FIGS. 2-6, including a short digression that focuses, inter alia, on the DCT and Hadamard transformations. Thereafter, the discussion will address two image transmission systems 700 and 800, shown in FIGS. 7 and 8, that each incorporates a different embodiment of our technique.

Figure 2:
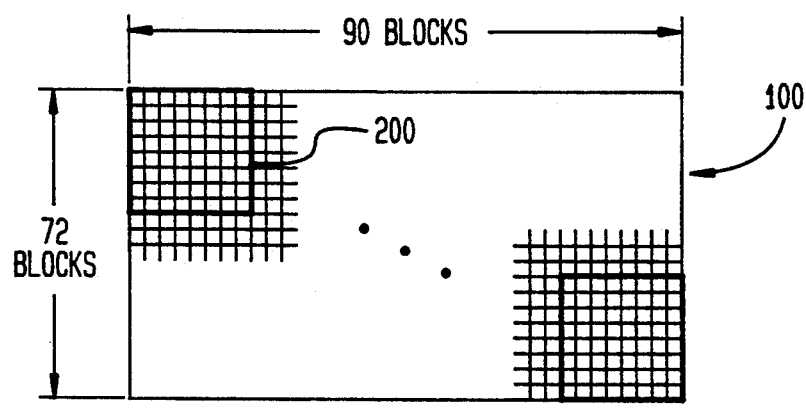
FIG. 2 depicts image 100 shown in FIG. 1 divided into 8-by-8 pixel blocks for use in transform coding.

In order to transform code image 100 shown in FIG. 1 for subsequent transmission of the image data therein, this image is first partitioned into typically 8-by-8 blocks of pixel values. As depicted in FIG. 2, image 100, so partitioned, would consist of 72 rows of 90 8-by-8 pixel blocks, of which block 200 is typical.

In accordance with our inventive technique, the pixel blocks for the entire image can be subjected to a global block Hadamard transformation prior to being transformed, through for example the DCT, into the frequency domain. The Hadamard transformation would permute the value of each pixel situated in the image in a specific manner with all the other pixel values situated therein, as described below. Alternatively, each of these blocks of pixel values can first be transformed through the DCT with the resulting transform coefficients for the entire image then being subjected to the global block Hadamard transformation. In this latter case, the Hadamard transformation would then permute each of the coefficient values, rather than the pixel values, for the image with all the other such coefficients. The Hadamard transformation would provide the same identical linear combinations of either the pixel values or transform coefficients.

At this point and to facilitate reader understanding, the discussion will now digress slightly to define various mathematical conventions used in the DCT transformation, as we employ it, and then briefly explain the DCT and Hadamard transformations themselves.

Figure 3B:
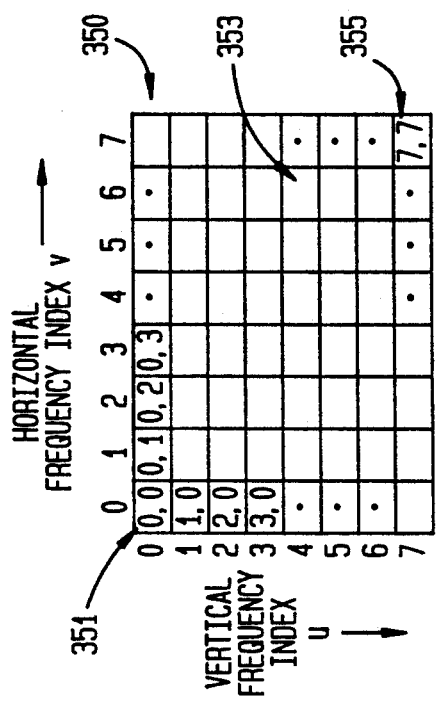
FIGS. 3A and 3B depict the identifying coordinate values for respectively each 8-by-8 pixel block (i.e. the pixel sampling convention) and a resulting 8-by-8 block of DCT transform coefficients (frequency components) therefor (i.e. the transform coefficient convention)
Figure 3A:
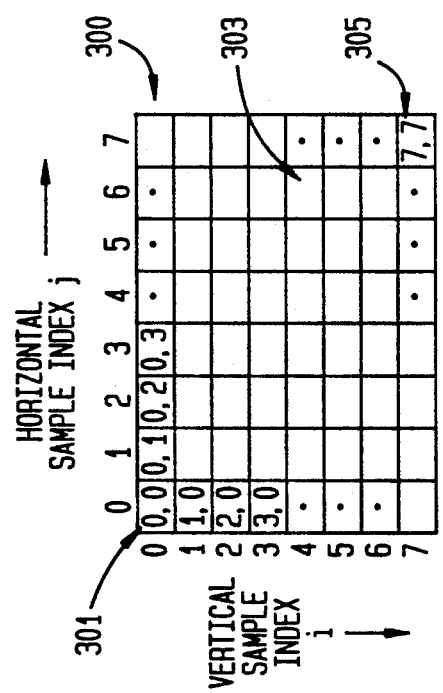

FIG. 3A depicts the identifying coordinate values (i.e. the pixel sampling convention) for each 8-by-8 pixel block, illustratively block 300. The sampling indices "i" and "j" respectively designate pixels, $P_{i,j}$, running vertically downward and horizontally to the right of pixel 301 (having coordinates (0,0)) situated at the upper left hand corner of the block. As shown, each of these indices runs from the value zero to seven. Pixels 303 and 305 situated within block 300 represent intermediate and final pixels in that block respectively having coordinates (4,6) and (7,7). The DCT transform of each 8-by-8 block of pixel values yields 64 transform coefficients (frequency components) which are organized in an 8-by-8 block that has the transform coefficient convention depicted in FIG. 3B. As shown, for illustrative transform coefficient block 350, the frequency indices "u" and "v" designate vertical and horizontal spatial frequencies increasing vertically downward and horizontally to the right, respectively, of DC component 351 (having coordinates (0,0)) which is situated at the upper left hand corner of block 350. As shown, each of these indices runs from the value zero to seven. Frequency components 353 and 355 situated within block 350 represent intermediate and final spatial frequency components respectively having coordinates (4,6) and (7,7).

The discrete cosine transform, F(u,v), of an 8-by-8 matrix of pixel values, f(i,j), such as for block 300, with the sampling convention shown in FIG. 3A and the inverse DCT transform of an 8-by-8 matrix of transform coefficients, such as for block 350, with the transform coefficient convention shown in FIG. 3B are respectively given by equations (1) and (2), as follows:

$$F(u,v) = \tfrac{1}{4}C(u)C(v) \sum_{i=0}^{7}\sum_{j=0}^{7} f(i,j) \cos\left[\frac{(2i+1)u\pi}{16}\right] \cdot \cos\left[\frac{(2j+1)v\pi}{16}\right] \quad (1)$$

$$f(i,j) = \tfrac{1}{4} \sum_{u=0}^{7}\sum_{v=0}^{7} C(u)C(v)F(u,v) \cos\left[\frac{(2i+1)u\pi}{16}\right] \cdot \cos\left[\frac{(2j+1)v\pi}{16}\right] \quad (2)$$

where:

$$C(u) = 1/\sqrt{2} \quad \text{for } u = 0, \text{ and}$$
$$= 1 \quad \text{otherwise;}$$
$$C(v) = 1/\sqrt{2} \quad \text{for } v = 0, \text{ and}$$
$$= 1 \quad \text{otherwise;}$$

$f(i,j)$ contains a value of $-128$ to $+127$ for each pixel; and $F(u,v)$ has a value of $-1023$ to $+1023$ for each DCT transform coefficient.

The DCT only deals with real, and not imaginary, components. Furthermore, the DCT concentrates most of the information in each image into relatively few low frequency transform coefficients. Inasmuch as the resulting frequency information has a response pattern that generally matches the spatial frequency response of a human eye, the higher order DCT frequency components, which are not visible to a typical viewer, are usually zero-valued. Thus, these higher order components can be safely ignored with essentially no noticeable affect on the resulting reconstructed image. As such, the DCT is calculated to yield only 64 separate frequency components. To provide high speed processing, the DCT for each separate 8-by-8 pixel block can be implemented in one or more dedicated high speed digital integrated circuits. Since the specific manner through the DCT can be calculated for such a pixel block is well known in the art and does not form part of the present invention, then, for purposes of simplification, any further details on the DCT itself or its implementation have been omitted from the following discussion. For these details, the reader may consult, for example, K. R. Rao et al, *Discrete Cosine Transform—Algorithms, Advantages, Applications* (©1990: Academic Press, San Diego), particularly Chapter 5 thereof "Two-Dimensional DCT algorithms", pages 88–121; and N. Ahmed et al, "Discrete Cosine Transform", *IEEE Transactions on Computers*, January 1974, pages 90–93.

We now define the Hadamard transformation of a data matrix to be the product of that matrix multiplied by an appropriately sized Hadamard matrix. Conversely, we define the inverse Hadamard transformation to be the product of a matrix of Hadamard transformed data multiplied by the appropriately sized inverse Hadamard matrix. For an input data matrix, the Hadamard transformation, as will be evident shortly, generates an output matrix which contains at each of its elements a pre-defined linear combination of all the elements of that data matrix.

A Hadamard matrix, H, is an orthogonal n-by-n matrix, i.e. having rows with orthogonal n-tuples, whose elements are the real numbers $+1$ and $-1$. In its simplest form, a 2-by-2 Hadamard matrix, $H_2$, is given by equation (3) below.

$$H_2 = \begin{bmatrix} 1 & 1 \\ 1 & -1 \end{bmatrix} \quad (3)$$

The Hadamard matrix has the property that any higher order Hadamard matrix is itself a Hadamard matrix of the next lower order. In this regard, the next higher Hadamard matrix, $H_4$, from that shown in equation (3) is given by equation (4) below, and so on for successive higher order Hadamard matrices.

$$H_4 = \begin{bmatrix} H_2 & H_2 \\ H_2 & -H_2 \end{bmatrix} \quad (4)$$

Any higher order Hadamard matrix can be constructed by iteratively forming a tensor product ($\otimes$), also referred to as a Kroenecker product, of the appropriate low order Hadamard matrices, i.e. by iteratively replacing the separate matrix entries in the higher order Hadamard matrix by the entries of the appropriate lower order Hadamard matrices themselves until a matrix is constructed containing only the values $+1$ and $-1$. Accordingly, Hadamard matrix $H_4$ is given by equation (5) below.

$$H_4 = H_2 \quad H_2 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (5)$$

Accordingly, the next higher order Hadamard matrix, i.e. $H_8$, is simply given by the equation $H_8 = H_4 \otimes H_2$ and would be formed by replacing each entry in matrix $H_4$ with the Hadamard matrix $H_2$ and with the appropriate sign therefor, and so on for successively higher order Hadamard matrices. Hence, any Hadamard matrix $H_{2^m}$, can be readily constructed for any positive integer m. For any Hadamard matrix $H_{2^m}$, its inverse is given by equation (6) below:

$$[H_{2^m}]^{-1} = 2^{2m} H_{2^m} \quad (6)$$

Inasmuch as the inverse of a Hadamard matrix, $H_{2^m}$, can be readily obtained by merely shifting each entry in that matrix by $2^m$ positions, then any matrix of data, that has been multiplied by a Hadamard matrix of a given order to generate Hadamard transformed data, can be reconstructed by merely shifting each transformed data entry by a corresponding number of bit positions. Such shift operations are exceptionally easy and essentially trivial to implement in a digital environment.

Now, with the preceding understanding of the DCT and Hadamard transformations in mind, we will now continue with the discussion of our inventive technique.

Figure 4:
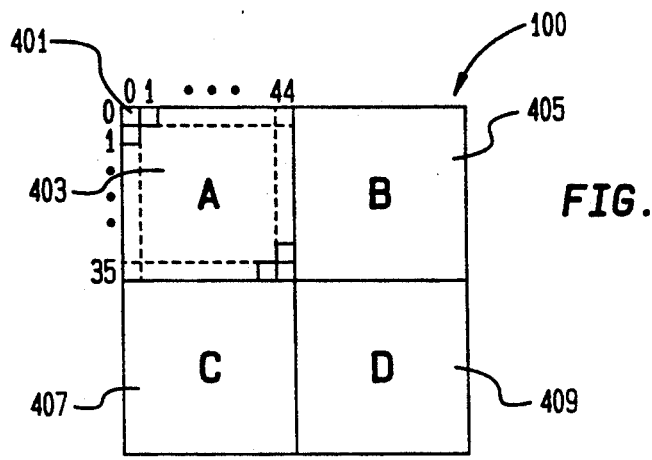
FIG. 4 depicts a simplified view of the data in image 100 as containing a single value representing the pixel values or transform coefficient values in each quadrant of the image prior to performing a global block Hadamard transformation on the data for the entire image.

To simplify the discussion and particularly the accompanying matrix mathematics but without any loss of insight, consider image 100 as containing only four quadrants 403, 405, 407 and 409, as shown in FIG. 4, each containing datum collectively identified by a single letter "A", "B", "C" or "D", respectively. In effect each letter can represent a matrix of pixel values or accompanying transform coefficients with each quadrant containing 36 rows of 45 8-by-8 blocks of data for image 100.

All the data in image 100 is processed through the global block Hadamard transformation to permute all the image data. If all the pixel data is to be permuted, then the resulting Hadamard transformation is mathematically described by equation (7) below. For purposes of this equation (and equation (8) which follows), image 100 contains a $M_1N_1$-by-$M_2N_2$ matrix, P, of real pixel values, where $M_1$, $M_2$, $N_1$ and $N_2$ are integers; illustratively $M_1$ and $M_2$ each equals the value 8, and $N_1$ and $N_2$ respectively equals the values 72 and 90 for the image shown in FIG. 2.

$$P^\sim = (H_{N1} \otimes I_{M1})(P)(H_{N2} \otimes I_{M2}) \qquad (7)$$

where:

$P^\sim$ is the resulting matrix of Hadamard transformed pixel data for the image; and $I_{M1}$ and $I_{M2}$ are identity matrices of the size $M_1$-by-$M_1$ and $M_2$-by-$M_2$, respectively. Applying equation (7) to the simplified four quadrant image shown in FIG. 4 and by virtue of the Hadamard transformation, the post-Hadamard transformed data in each quadrant will be formed of a pre-defined linear combination of the pixel data situated in all of the quadrants, as given below in equation (8).

$$P^\sim = \begin{bmatrix} I & I \\ I & -I \end{bmatrix} \begin{bmatrix} A & B \\ C & D \end{bmatrix} \begin{bmatrix} I & I \\ I & -I \end{bmatrix} = \qquad (8)$$

$$\begin{bmatrix} A+C+B+D & A+C-B-D \\ A-C+B-D & A-C-B+D \end{bmatrix}$$

The Hadamard transformed pixel data is then transform coded using the DCT to yield transform coefficients. These coefficients are then appropriately quantized and compression coded into appropriate transmission symbols for subsequent transmission to a far end location.

Alternatively, if each block of pixel values in image 100 is to be first separately transformed through the DCT into blocks of transform coefficients which are, in turn, all collectively permuted through the global Hadamard transformation, then the resulting Hadamard transformation is mathematically described by equation (9) below.

$$P^\wedge = (H_{N1} \otimes I_{M1})(I_{N1} \otimes C_{M1})(P)(I_{N2} \otimes C_{M2})^t(H_{N2} \otimes I_{M2})^t \qquad (9)$$

where: $P^\wedge$ is the resulting matrix of Hadamard transformed DCT transform data for the image;

$C_{M1}$ and $C_{M2}$ are DCT transform coefficient matrices of size $M_1$-by-$M_1$ and $M_2$-by-$M_2$, respectively; and "t" represents a matrix transpose operation. If the transform coefficient data for image 100 is represented by the four quadrant single letter data as described above, then all the transformed DCT coefficients would be permuted by the same linear combinations set forth in equation (8) above. The resulting permuted coefficients are then compression coded into appropriate sequences of transmission symbols for subsequent transmission.

Inasmuch as each resulting global Hadamard transformed pixel value or DCT coefficient contains a portion, either positive or negative, attributable to respectively every other pixel value or DCT coefficient, then all the data for image 100 can be viewed as being diffused ("smeared") across the entire image by the global Hadamard transformation. To reconstruct the image, i.e. produce a replica of that image, the "smeared" data is subjected to an inverse Hadamard transformation to extract the individual pixel values or associated DCT transform coefficients therefor. By virtue of the localized redundancies in the image data, as described below, then whenever a burst (or similar) error occurs and obliterates a portion of the "smeared" data for the image, the remaining "smeared" data, containing linear combinations of all the pixel values or DCT coefficients therefor, is still very likely to contain sufficient information to allow a replica of the entire image to be subsequently constructed through the inverse Hadamard transformation, in the manner set forth below. Advantageously, the replica, while likely degraded in quality somewhat from the original due to the loss of some of the "smeared" information, will not likely contain any localized corruptions, such as "holes" or the like in either the spatial or frequency domains. The quality will continue to degrade as the information loss becomes greater, however the loss will be spread across the entire image rather than being localized.

Figure 5:
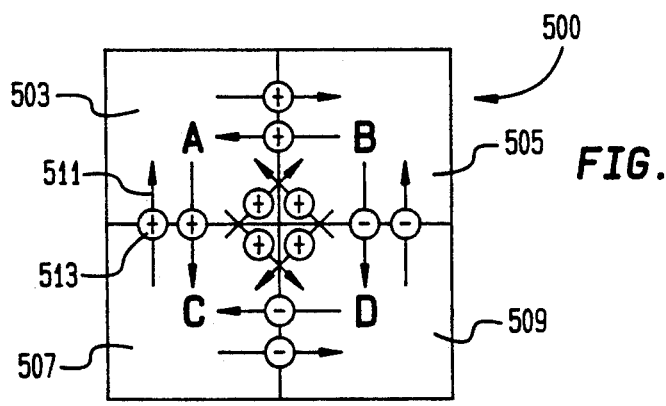
FIG. 5 diagrammatically depicts the manner in which image diffusion occurs within illustratively image 100 shown in FIG. 4 by virtue of performing a global block Hadamard transformation of either the pixel values contained therein or the transform coefficients therefor in order to create "holographic-like" data 500 for image 100.
Figure 6:
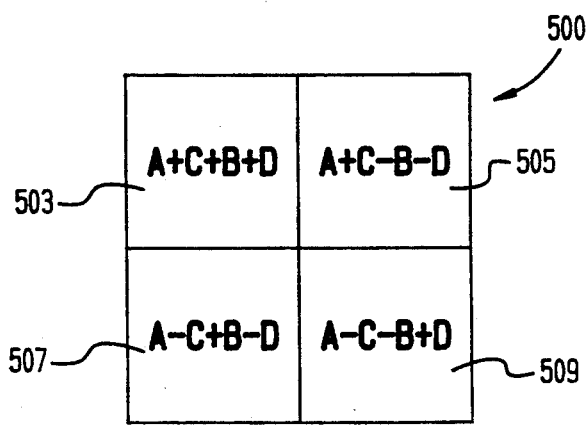
FIG. 6 depicts the manner in which the data in each quadrant of image 100 shown in FIG. 4 has been permuted by the global block Hadamard transformation in order to obtain "holographic-like" image data 500 therefor.

FIG. 5 diagrammatically depicts the manner through which the global Hadamard transformation diffuses the data for image 100 shown in FIG. 4 throughout the entire image in order to create new "smeared" image data. Inasmuch as new image data is being created, the resulting image is shown as image 500 having quadrants 503, 505, 507 and 509. Each arrow, such as arrow 511, represents the direction in which the single datum for each quadrant of image 500 is diffusing into the datum for every other quadrant. Each operator ($\oplus$ or $\ominus$), such as operator 513, indicates whether a particular datum that is diffusing into a quadrant is being positively or negatively combined with the original datum therefor in order to create a pre-defined linear combination in that quadrant of all the datum. Inasmuch as each datum in image 500 contains a portion of all the individual original items of data (either pixel values or transform coefficients) existing in image 100, image data 500 is "holographic-like". The resulting Hadamard transformed data of image 100 that yields image 500 is shown in FIG. 6. The resulting data in each quadrant of image 500 is a known linear combination of all the data existing in image 100. Clearly, as the Hadamard transformation is globally applied to all the individual pixel values or transform coefficient values rather than to the four single items of data shown in FIG. 4, then each resulting Hadamard transformed pixel value or DCT transform coefficient value would respectively have a different unique linear combination associated therewith of either all the original pixel values or DCT transform coefficient values for the image, wherein each such combination would accordingly and respectively contain as many terms as there are either pixel values or transform coefficients therefor in the image data.

The Hadamard transformation does not appreciably, if at all, change the statistical character of either the blocks of DCT transform coefficients or pixel values. Specifically, as to the DCT transform coefficients, since most of the image content is concentrated, as discussed above, in the lower frequency components produced by the DCT, the statistical nature of these components is substantially the same for linear combinations of these components, such as those generated by the Hadamard transformation. Similarly, as to the pixel values themselves, the local redundancies inherent in these values are not changed by linear combinations of these values, such as those produced by the Hadamard transformation. The block structure of matrices $P^\sim$ or $P^\wedge$ be compressed by compression coding using any one of many well known standard methods of entropy coding (including a necessary model for sequencing of symbols), inter alia, arithmetic coding such as Q-coding or variants thereof, Ziv-Lempel or variants thereof, and Huffman coding. By using appropriate well known resynchronization techniques, the image data can be coded in a conventional manner that bypasses a corrupted section of compressed image data and resumes decoding with only a limited loss of information. However, by virtue of the holographic-like nature of the Hadamard transformed image data provided by our inventive technique, this loss, upon decompression and decoding, is spread throughout the entire reconstructed image, rather than obliterating a localized portion of that image itself.

Our technique functions particularly well with data, such as image data, which has high local redundancies. Image data, such as a block of pixels, is highly correlated locally with the correlation between any pixel and another decreasing exponentially as the distance between these two pixels increases. In this regard, the expected value, $\epsilon(x_i, x_{i-j})$ of an image pixel, $x_i$, based upon another pixel, $x_{i-j}$, is generally given by equation (10) below.

$$\epsilon(x_i, x_{i-j}) = \delta^{|i-j|} \quad (10)$$

where:

$\delta$ generally has a value between 0 and 1.

We will now basically show that essentially the same statistics still result by virtue of a linear combination of near and far pixels, as would occur through use of the global Hadamard transformation of pixel data. Consider two new pixel values, $y_i$ and $y_{i-j}$, formed by the sum of two local pixel values, $x_i$ and $x_{i-j}$, and corresponding distant pixel values, $x_{n+i}$ and $x_{n+i-j}$, as indicated in equations (11) and (12) below.

$$y_i = x_i + x_{n+i} \quad (11)$$

$$y_{i-j} = x_{i-j} + x_{n+i-j} \quad (12)$$

where n is an index of pixel locations and is assumed to be a relatively large integer value.

We now define the following expected value as set forth in equation (13) below:

$$\epsilon(y_i, y_{i-j}) = \epsilon \frac{((y_i\, y_{i-j}))}{\epsilon(y_i^2)} \quad (13)$$

The value $\epsilon(y_i, y_{i-j})$ can be calculated, through substitution and multiplication, as given by equations (14) below.

$$\epsilon(y_i, y_{i-j}) = \frac{\epsilon((x_i + x_{n+i})(x_{i-j} + x_{n+i-j}))}{\epsilon((x_i + x_{n+i})^2)} \quad (14)$$

$$= \frac{\epsilon((x_i x_{i-j} + x_i x_{n+i-j} + x_{n+i} x_{i-j} + x_{n+i} x_{n+i-j}))}{\epsilon(x_i^2 + 2 x_i x_{n+i} + x_{n+i}^2)}$$

$$= \frac{\epsilon(2 x_i x_{i-j} + x_i x_{n+i-j} + x_{n+i} x_{i-j})}{\epsilon(2 x_i^2 + 2 x_i x_{n+i})}$$

Since the cross-terms have essentially no correlation due to the relatively large distances between their respective pixels, the expected values of $x_i x_{n+i-j}$, $x_{n+i} x_{i-j}$ and $x_i x_{n+i}$ are all approximately zero. Therefore, equation (14) reduces to equation (15) as follows.

$$\epsilon(y_i, y_{i-j}) = \frac{\epsilon(2 x_i x_{i-j})}{\epsilon(2 x_i^2)} = \frac{\epsilon(x_i x_{i-j})}{\epsilon(x_i^2)} = \epsilon(x_i, x_{i-j}) \quad (15)$$

Thus, the statistics of the linear combination of the pixel values will contain essentially the same statistics as those of the individual pixels that form that sum thereby indicating that the pixel value statistics are substantially unaffected by the Hadamard transformation.

Figure 7:
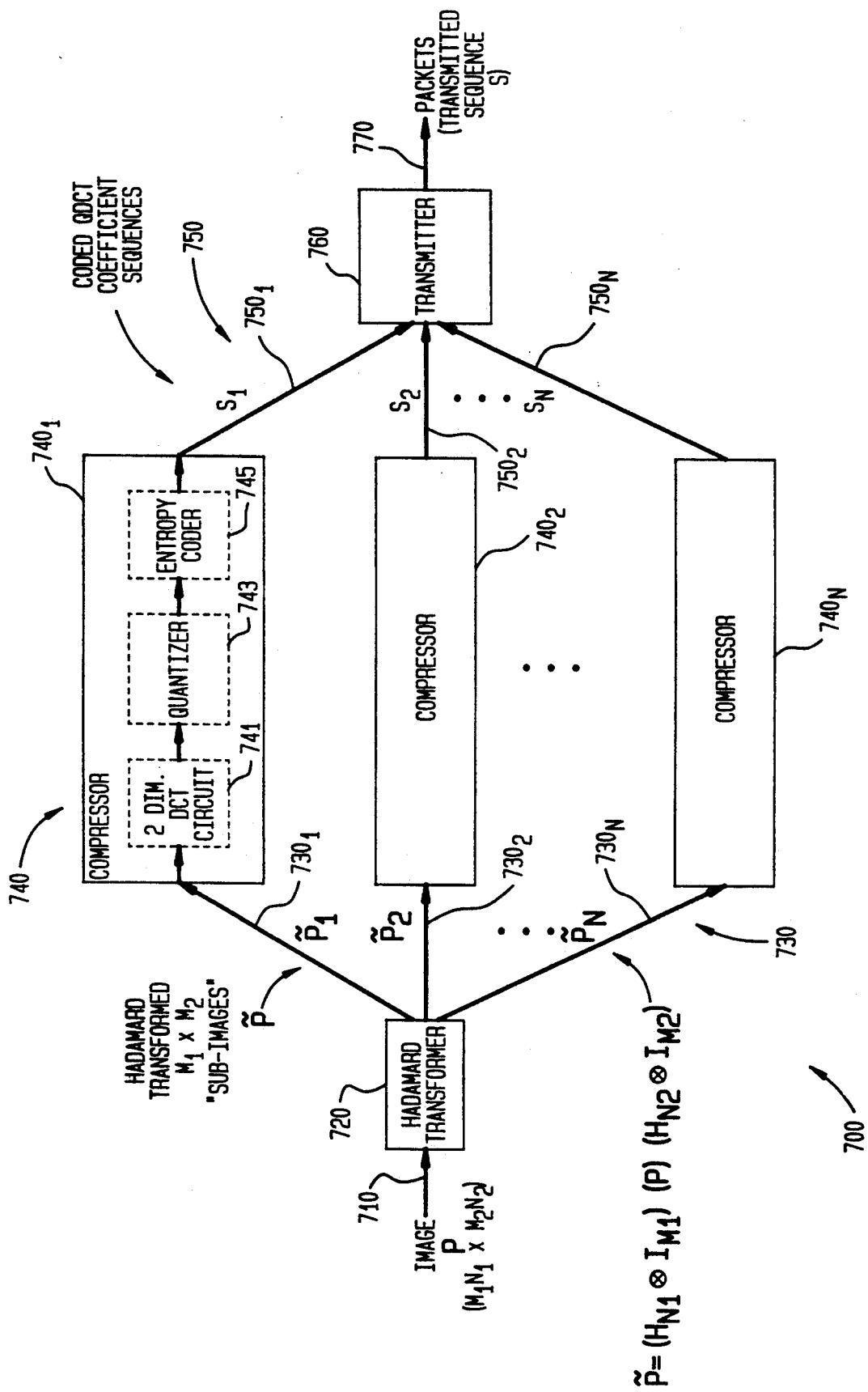
FIG. 7 depicts a high level block diagram of an image transmission system that incorporates a first embodiment of our inventive technique, i.e. global block Hadamard transformation of image pixel values.
Figure 8:
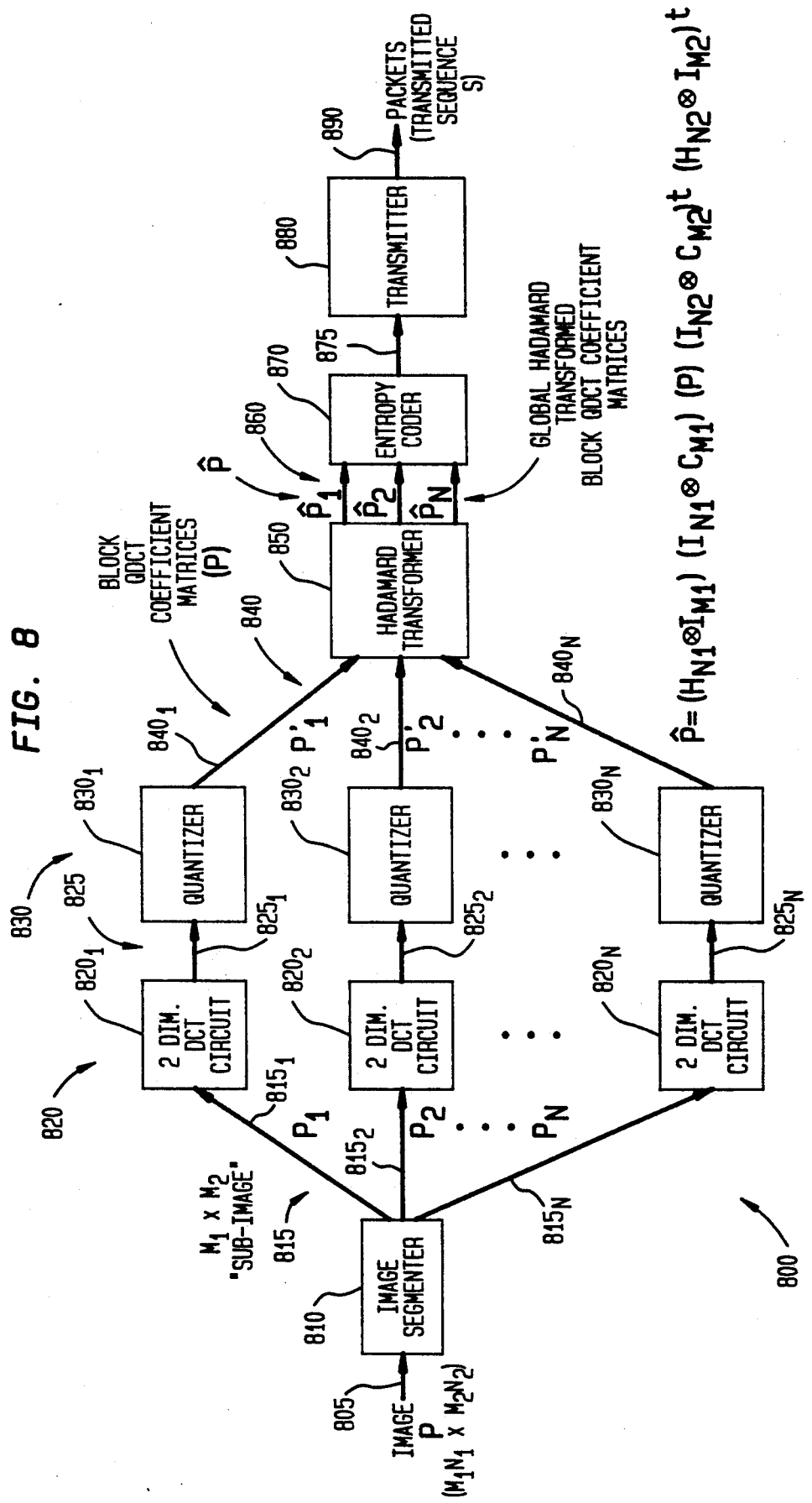
FIG. 8 depicts a high level block diagram of an image transmission system that incorporates a second embodiment of our inventive technique, i.e. global block Hadamard transformation of transform (illustratively DCT) coefficient values.

Having discussed our inventive technique in the context of two different embodiments thereof, we will now turn to describing FIGS. 7 and 8 which depict two image transmission systems 700 and 800 that utilize these embodiments.

In particular, FIG. 7 depicts a high level block diagram of image transmission system 700 that incorporates a global block Hadamard transformation of image pixel values followed by DCT transformation and entropy coding. As depicted, system 700 is formed of Hadamard transformer 720; identical compressors $740_1$, $740_2$, ... $740_N$, which collectively form compressors 740; and transmitter 760.

Incoming pixel values for the original image, matrix P, which as noted above, is formed of an $M_1N_1$-by-$M_2N_2$ matrix, are applied over lead 710 to Hadamard transformer 720. Transformer 720 performs a global Hadamard transformation of matrix P and provides resulting 8-by-8 blocks of transformed pixel values $P_1\tilde{}$, $P_2\tilde{}$, ..., $P_N\tilde{}$, which collectively form transformed matrix $P\tilde{}$, to corresponding leads $730_1$, $730_2$, ..., $730_N$ which collectively form leads 730. Transformer 720 will necessarily need to have sufficient processing and storage capacity to transform the entire matrix of pixel values. However, since the Hadamard transformation only requires additions and subtractions, the transformer can be implemented relatively easily and inexpensively using an appropriate programmed microprocessor or similar device, or even dedicated processing circuitry or hardware; the implementation of which using any of these devices is well within the skill in the art.

The individual transformed pixel blocks produced by transformer 720 and collectively applied to leads 730 are routed to compressors 740. Compressors $740_1$, $740_2$, ..., $740_N$ generate an appropriate sequence of compressed quantized DCT coefficient values for each corresponding transformed pixel block. For efficient operation, these compressors can operate in parallel or on a time staggered basis, as desired, with the DCT circuit, quantizer and entropy coder located within each such compressor operating on a pipelined basis. Inasmuch as these compressors are all identical, the discussion will only specifically consider compressor $740_1$. This individual compressor contains two-dimensional DCT circuit 741, quantizer 743 and entropy coder 745. Incoming transformed pixel block $P_1\tilde{}$ is applied over lead $730_1$ to circuit 741 which transforms the pixel values in this block, via a two-dimensional DCT, into an 8-by-8 block of transform coefficients (frequency component values). Since, as noted above, the art is well versed in circuits, specifically including single integrated circuit embodiments, for calculating the DCT, specifically for an 8-by-8 (or even larger) pixel block, the specific circuitry used within circuit 741 to implement the DCT will not be discussed in any detail. The resulting block of DCT transform coefficients is then applied to quantizer 743 which appropriately quantizes each of these coefficients. This quantizer can be any one of many different quantizers known in the art and utilize scaling, rounding, or truncation, as desired. With proper quantizing, any diminished high spatial frequency content existing in a reconstructed image is rarely, if ever, apparent to a viewer. The resulting quantized block of DCT coefficients is applied to entropy coder 745 which codes these quantized coefficients into an appropriate transmission symbol(s). The coder, which can be any one of many such coders known in the art, typically uses increasingly fewer bits to code coefficients for increasingly high spatial frequencies over those used to code the low frequency components. While the quantization process used within quantizer 743 imparts some loss into the reconstructed image and is irreversible, the coding process used within coder 745 is usually reversible and, for the most part, loss-less. Transmission symbols in sequences $S_1, S_2, \ldots, S_N$, for the coded blocks of DCT transform coefficients produced by corresponding compressors $740_1, 740_2, \ldots, 740_N$ are collectively applied to transmitter 760. The transmitter can utilize any one of many well known transmission schemes. For example, for packet communications, transmitter 760 fabricates appropriate data packets that contain these symbols in proper order, as a collective sequence S, along with, inter alia, appropriate framing and protocol bits, and transmits these packets over an appropriate communication channel to a far end receiver (both of which are not shown). In a packet environment, transmitter 760 can utilize any one of many well known communication protocols. The transmitter can also incorporate, inter alia, scrambling, data encryption, and/or error control and resynchronization schemes, as desired.

At the far end receiver, the inverse process to that depicted in FIG. 7 would be used to construct a replica of the original image, i.e. matrix P. Specifically, the incoming transmission symbols would first be appropriately decoded into successive blocks of transform coefficients which are then, in turn, transformed by appropriate inverse DCT circuit(s) back into pixel values. These values would thereafter be subjected to an inverse global Hadamard transformation. Inasmuch as the inverse Hadamard transformation, as discussed above, can be implemented simply through shift operations, then this inverse transformer can be implemented extremely easily and inexpensively using appropriate digital hardware and/or software that is well within the current skill in the art.

FIG. 8 depicts a high level block diagram of image transmission system 800 that incorporates a global block Hadamard transformation of transform (illustratively DCT) coefficient values followed by entropy coding. As depicted, system 800 is formed of image segmenter 810; two-dimensional DCT circuits $820_1, 820_2, \ldots, 820_N$ which collectively form DCT circuits 820; quantizers $830_1, 830_2, \ldots, 830_N$ which collectively form quantizers 830; Hadamard transformer 850; entropy coder 870; and transmitter 880.

Incoming pixel values for the original image, i.e. matrix P, which as above is formed of an $M_1N_1$-by-$M_2N_2$ matrix, are applied over lead 805 to image segmenter 810. This segmenter partitions the image, in a well known manner, into 8-by-8 blocks of pixel values. The pixel values for each resulting pixel block, $P_1, P_2, \ldots, P_N$, are applied over corresponding leads $815_1, 815_2, \ldots, 815_N$, which collectively form leads 815, to an input of corresponding two-dimensional DCT circuits $820_1, 820_2, \ldots, 820_N$, which collectively form DCT circuits 820. All these DCT circuits are identical, with each of which transforming the pixel values in a corresponding 8-by-8 block of pixel values into DCT transform coefficients. Each of these DCT circuits functions the same as and is implemented in the same fashion as is DCT circuit 741 described above and shown in FIG. 7. As shown in FIG. 8, the transform coefficients for each pixel block produced by DCT circuits $820_1, 820_2, \ldots, 820_N$ are applied over corresponding leads $825_1, 825_2, \ldots, 825_N$, which collectively form leads 825, to quantizers $830_1, 830_2, \ldots, 830_N$, respectively, which collectively form quantizers 830. All these quantizers are identical and appropriately quantize the transform coefficients for every block to yield quantized matrices $P'_1, P'_2, \ldots, P'_N$, which collectively form quantized matrix $P'$. Each of quantizers 830 functions the same as and is implemented in the same fashion as is quantizer 743 described above and shown in FIG. 7. For efficient operation, all the paired DCT circuits and quantizers (such as illustratively DCT circuit $820_1$ and quantizer $830_1$ shown in FIG. 8) can operate in parallel or on a time staggered basis, as desired, with the DCT circuit and its associated quantizer in each such pair operating on a pipelined basis. The quantized transform coefficient matrices $P'_1, P'_2, \ldots, P'_N$ are applied over corresponding leads $840_1, 840_2, \ldots, 840_N$, which collectively form leads 840, to Hadamard transformer 850. This transformer performs a global Hadamard transformation of matrix $P'$ and provides resulting 8-by-8 blocks of transformed quantized DCT (QDCT) coefficients values $P^{\wedge}_1, P^{\wedge}_2, \ldots, P^{\wedge}_N$, which collectively form transformed QDCT coefficient matrix $P^{\wedge}$. Hadamard transformer 850 functions the same as and is implemented in the same fashion as is Hadamard transformer 720 described above and shown in FIG. 7. As shown in FIG. 8, the resulting 8-by-8 blocks of Hadamard transformed coefficients within matrix $P^{\wedge}$, specifically blocks $P^{\wedge}_1, P^{\wedge}_2, \ldots, P^{\wedge}_N$, are applied over leads 860 to corresponding inputs to entropy coder 870. The entropy coder codes the Hadamard transformed coefficients in all the QDCT coefficient matrices, in a proper sequence, into appropriate transmission symbols. The coder utilizes the same entropy coding technique as does entropy coder 745 with the exception that this coder codes, in seriatim, all the blocks of Hadamard transformed QDCT coefficients for the image rather than just one block of QDCT coefficients as does coder 745. The resulting sequence, S, of transmission symbols produced by coder 870 is applied, via lead 875, as input to transmitter 880. This transmitter is identical to transmitter 760 as described above and shown in FIG. 7 and produces a stream of data packets containing the proper sequence of transmission symbols for the encoded Hadamard transformed QDCT transform coefficients for subsequent carriage over an appropriate communication channel to a far end receiver (both of which are not shown). As with transmitter 760 shown in FIG. 7, transmitter 880 depicted in FIG. 8 can insert, inter alia, appropriate well known framing and protocol bits into the transmitted packets. In addition, transmitter 880 can utilize any one of many well known communication protocols and can also incorporate, inter alia, scrambling, data encryption, and/or error control and resynchronization schemes, as desired.

At the far end receiver, the inverse process to that depicted in FIG. 8 would be used to construct a replica of the original image, i.e. matrix P. Specifically, the incoming transmission symbols would first be appropriately decoded into successive blocks of transform coefficients. All of the resulting coefficients would then be subjected to an inverse global Hadamard transformation, with the transformation being implemented, as noted above, through appropriate shift operations.

Thereafter, each 8-by-8 block of inversely transformed QDCT coefficients would be transformed by an appropriate inverse DCT circuit into an 8-by-8 block of pixel values from which a replica of matrix P is constructed. This entire procedure can be mathematically described by equation (16) as follows.

$$P = (I_{N2} \otimes C_{M2})^{-1}(H_{N2} \otimes I_{M2})^{-1}(P)(H_{N1} \otimes I_{M1})(I_{N1} \otimes C_{M1}) \quad (16)$$

Clearly, those skilled in the art can readily apply our inventive technique not only to grayscale but also to color images, including those that have been encoded with, for example, a separate matrix of pixel values for each one of three color coordinates. Specifically, if a coordinate system is comprised of a luminance and two chrominance coordinates, then each such coordinate would have a separate matrix of pixel values associated therewith. In this instance, either the pixel values in each of these matrices or the DCT transform coefficients therefor would be globally transformed through a Hadamard transformation in order to generate an appropriately diffused matrix for each of the different color coordinates prior to compression. Similarly, on reception or playback, each such diffused matrix would be decompressed and, depending upon which data was globally transformed, then either the resulting pixel values or the associated transform coefficients therefor would be processed through an inverse global Hadamard transformation in order to construct a replica of the original matrix of pixel values for each different color coordinate.

While we have described our inventive technique in the context of globally spreading all the pixel values or associated DCT transform coefficients in the image through the Hadamard transformation, it is readily apparent that our technique could be used with any one of many other well known block transforms, such as illustratively Fourier, block cosine or sine transforms. Also, our inventive technique could be readily applied to an image that constitutes a portion of a larger original image or a scaled down or parsed version of the original image. For example, "windowing" is frequently used by a user to isolate a desired portion of a larger image for specific display, storage and/or processing applications. The resulting "windowed" portion could be processed through our technique, with the Hadamard transformation only operating on that portion alone, to impart added robustness to that image portion against burst (or similar) errors that may occur during an subsequent operation. The original image could also be scaled downward or otherwise parsed in some desired fashion, such as, for example, by sampling every other horizontal and vertical pixel value therein to effectuate a ¼ reduction in scale, with our technique being then applied to the pixel values in an image, formed of the scaled or parsed version of the original image, in order to impart robustness thereto.

Furthermore, our inventive technique could also be used, with nearly any data that has sufficient localized redundancies—of which image data is only one illustrative type, as an adjunct to (i.e. layered with) any of the well known error correction, resynchronization and other techniques again to impart robustness to the data itself against a localized catastrophic loss of that data during a subsequent operation. Use of these other techniques when layered with our invention will hasten error recovery and synchronization thereby limiting the total amount of information that is lost by virtue of a burst (or similar) error itself and the time required by a receiver to regain synchronization therefrom.

Although two embodiments of the present invention have been shown and described in detail herein, many other varied embodiments that incorporate the teachings of the present invention may be easily constructed by those skilled in the art.

We claim:

1. Apparatus for imparting robustness to image data against localized data loss comprising:
   a first transformer, responsive to an incoming matrix of pixel values representing an image, for globally transforming said matrix of pixel values through a block transformation so as to produce a plurality of blocks of transformed pixel values such that each transformed pixel value in each of said blocks of transformed pixel values is a pre-defined combination of all the pixel values in said incoming matrix;
   a second transformer for transforming each one of the blocks of transformed pixel values into a corresponding one of a plurality of blocks of transform coefficients;
   a quantizer for quantizing each one of said plurality of blocks of transform coefficients to yield a corresponding one of a plurality of blocks of quantized transform coefficients;
   a coder for compressively coding said plurality of blocks of quantized transform coefficients into corresponding symbols; and
   means for applying said symbols in a pre-defined sequence to a channel; and
   wherein as a result of globally transforming said matrix of pixel values an image represented by said symbols possesses increased robustness against localized data loss occasioned by a channel imperfection.

2. The apparatus in claim 1 wherein the block transformation is a Hadamard transformation.

3. The apparatus in claim 2 wherein said second transformer comprises a circuit for separately transforming each of said blocks of transformed pixel values through a discrete cosine transform (DCT) into the corresponding one of said plurality of blocks of transform coefficients.

4. The apparatus in claim 3 wherein said second transformer comprises a plurality of substantially identical transform circuits for calculating the DCT, wherein each one of said plurality of transform circuits calculates the DCT of a corresponding one of said blocks of pixel values so as to yield an associated one of the blocks of the transform coefficients; and said quantizer comprises a plurality of substantially identical quantizing circuits, wherein each one of said quantizing circuits is connected to a corresponding one of said transform circuits in order to quantize the transform coefficients produced thereby so as to yield an associated one of the blocks of the quantized transform coefficients.

5. The apparatus in claim 4 wherein said coder is an entropy coder.

6. The apparatus in claim 4 wherein said applying means transmits said symbols in a succession of packets over a communication channel.

7. Apparatus for imparting robustness to image data against localized data loss comprising:

a segmenter for segmenting an incoming matrix of pixel values representing an image into identically sized blocks of pixel values;

a first transformer for transforming each one of the blocks of pixel values into a corresponding one of a plurality of blocks of transform coefficients;

a quantizer for quantizing the coefficients in each one of said blocks of transform coefficients to yield a corresponding one of a plurality of blocks of quantized transform coefficients;

a second transformer for globally transforming all of said blocks of quantized transform coefficients through a block transformation into transformed data matrices such that each transformed data value in each of said transformed data matrices is a pre-defined combination of all the quantized transform coefficients in all of said blocks of quantized transform coefficients;

a coder for compressively coding said transformed data matrices into corresponding symbols; and means for applying said symbols in a pre-defined sequence to a channel; and wherein as a result of globally transforming all of said blocks of quantized transform coefficients an image represented by said symbols possesses increased robustness against localized data loss occasioned by a channel imperfection.

8. The apparatus in claim 7 wherein the block transformation is a Hadamard transformation.

9. The apparatus in claim 8 wherein said first transformer comprises a circuit for separately transforming each of said blocks of transformed pixel values through a discrete cosine transform (DCT) into the corresponding one of said plurality of blocks of transform coefficients.

10. The apparatus in claim 9 wherein said first transformer comprises a plurality of substantially identical transform circuits for calculating the DCT, wherein each one of said plurality of transform circuits calculates the DCT of a corresponding one of said blocks of pixel values so a to yield an associated one of the blocks of the transform coefficients; and said quantizer comprises a plurality of substantially identical quantizing circuits, wherein each one of said quantizing circuits is connected to a corresponding one of said transform circuits in order to quantize the transform coefficients in the associated one of the blocks of transform coefficients produced thereby so as to yield an associated one of the blocks of the quantized transform coefficients.

11. The apparatus in claim 10 wherein said coder is an entropy coder.

12. The apparatus in claim 10 wherein said applying means transmits said symbols in a succession of packets over a communication channel.

* * * * *